H. T. LIBBY.
PORTABLE IRRIGATION SYSTEM.
APPLICATION FILED DEC. 16, 1912. RENEWED MAY 6, 1916.
1,187,349.  Patented June 13, 1916.
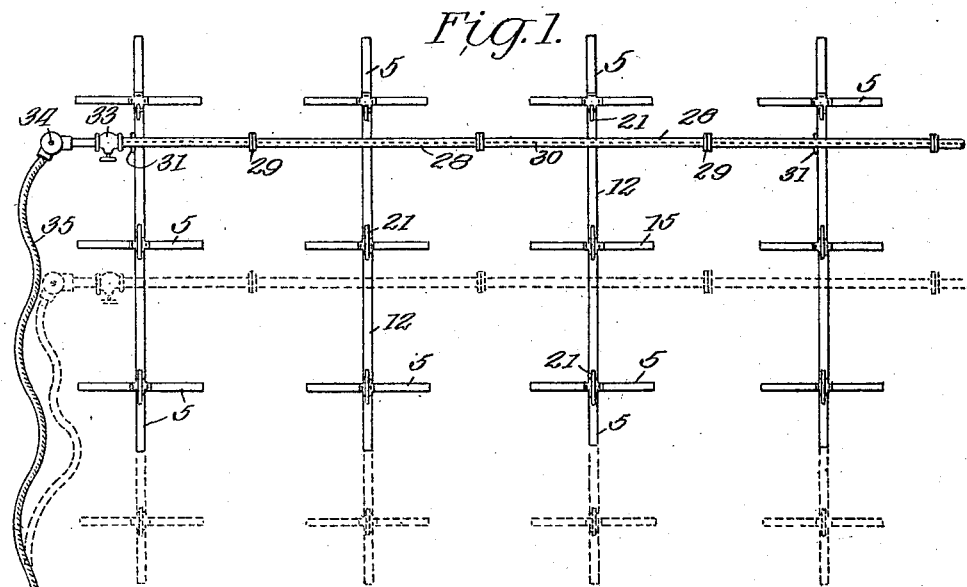
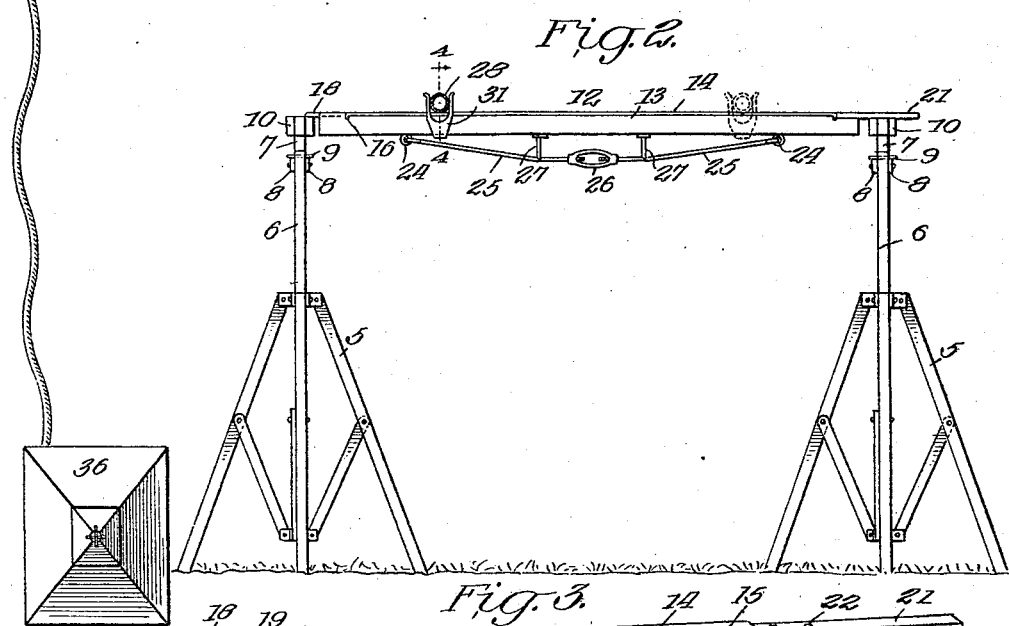
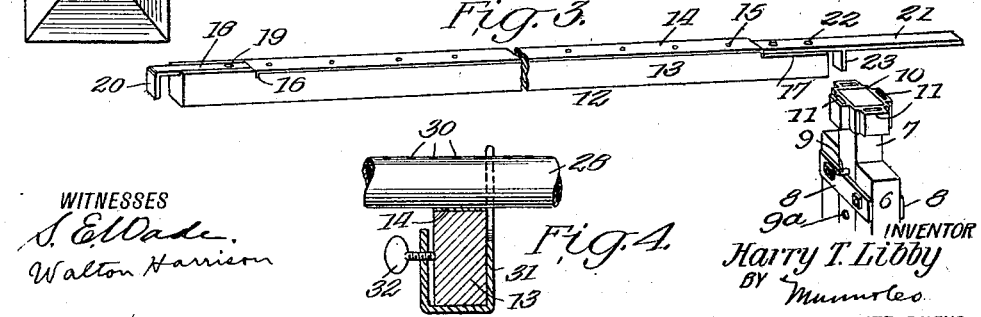
WITNESSES
S. E. Wade
Walton Harrison
INVENTOR
Harry T. Libby
BY Munnrles
ATTORNEYS

UNITED STATES PATENT OFFICE.

HARRY T. LIBBY, OF ALVIN, TEXAS.

PORTABLE IRRIGATION SYSTEM.

1,187,349.  Specification of Letters Patent.  Patented June 13, 1916.

Application filed December 16, 1912, Serial No. 736,967. Renewed May 6, 1916. Serial No. 95,970.

*To all whom it may concern:*

Be it known that I, HARRY T. LIBBY, a citizen of the United States, and a resident of Alvin, in the county of Brazoria and State of Texas, have invented certain new and useful Improvements in Portable Irrigation Systems, of which the following is a specification.

My invention relates to portable irrigation systems—that is to irrigation systems which comprise a maximum proportion of movable parts so that the system as a whole may be readily picked up and moved from one part of a field or orchard to another part thereof while at the same time the various movable parts may be shifted relatively to each other while the system is in use for the purpose of sprinkling water over a large territory and with a minimum of expense and trouble.

It may be explained in this connection that in various parts of the country where the rainfall is uncertain and the water-supply scarce during certain portions of the year, it is necessary to conserve the water available for purposes of irrigation and upon principles of economy, it is desirable that a given amount of water shall be distributed in such manner as to cover the largest area of ground. It is also desirable that the sprinkling pipe shall be of a kind easily shifted along over the ground to be watered, and that provision be made for enabling the sprinkling pipe to be readily brought directly over any predetermined portion of the ground. Owing to the considerations just stated, I have produced a system in which I employ a sprinkling pipe having generally a cylindrical form and supported upon a structure which I designate as a creeping scaffold, the sprinkling pipe being adapted to roll along the scaffold and thus be shifted from one point to another, the structure of the scaffold being such that it may be readily taken down at one of its extremities and built up at another extremity, the pieces removed in taking down the scaffold at its one extremity being simply transferred or shifted in position and rebuilt into the same scaffold structure. By this means only a small amount of scaffolding in the aggregate is required.

I further provide efficient means for rendering the creeping scaffold approximately level while in use and to this end I make provision for raising and lowering the scaffold at different points, at the will of the operator.

Reference is made to the accompanying drawing forming a part of this specification and in which like letters indicate like parts.

Figure 1 is a plan view of the structure embodied in my system. Fig. 2 is a vertical section through a part of the creeping scaffold. Fig. 3 is a detail showing in perspective one of the supporting beams forming a part of the scaffold and used for supporting the sprinkling pipe. Fig. 4 is a detail showing in section one of the guides for the sprinkling pipe.

I provide a number of supporting stands or pedestals 5 which are easily moved from one point to another and are adapted to be folded for promoting ease in shipping. Each supporting stand 5 is provided with an upwardly extending portion 6 constituting a slide-way and extending upwardly from each supporting stand is a supporting stem 7 which is mounted in the slide-way. Fitted upon opposite sides of the slide-way are plates 8 serving as guides for the stem 7. The supporting stem 7 is provided with holes 9ª so arranged that pins 9 may be inserted through these holes and rested upon the guide plates 8 in such manner as to sustain the folding stem 7 at different heights or levels relatively to the stands 5.

Each supporting stem 7 carries upon its upper end a bracket 10. This bracket is provided with a number of slots 11 as will be understood from Fig. 3. In order to raise or lower the supporting stem 7 the corresponding pin 9 is withdrawn, the supporting stem is pushed up or down as the case may be and the pin 9 is again inserted through the particular hole 9ª which is just above the guide plates 8. The supporting stem 7 and parts carried by it are now sustained upon the pin.

I provide a number of supporting beams of the kind shown more particularly in Fig. 3 and each designated as a whole by the numeral 12. Each beam is of composite form and comprises a body portion 13 of wood and various metal parts. Mounted upon the top of the wooden body portion 13 is a metallic strip 14 secured to it by aid of fastenings 15. One end of the strip 14 is bent downwardly and sunken into the adjacent part of the wooden body portion at 16. The strip 14 is provided with a portion 17 which is bent or offset slightly from the general upper surface of the strip, as shown at the right of Fig. 3. The flat bar 18 of metal is secured upon one end of the wooden body portion 13 and sunken slightly into the same being held by a screw 19. The flat bar 18 is bent at 20 and thus formed into a hook.

Mounted upon the offset portion 17 of the strip 14 is a metallic bar 21 secured in position by fastenings 22 and provided with a lug 23, this lug being integral with the bar 21. Upon the underside of the wooden body portion 13 are metallic eyes 24. Connected with these eyes are truss rods 25 and connected with the latter is a turn-buckle 26. Braces 27 in the form of short posts or brackets are mounted upon the wooden portion 13 and extend downwardly therefrom into engagement with the truss rods 25. The operator by grasping the turn-buckle 26 and rotating the same causes the truss rods 25 to be drawn toward or to be forced away from each other. The purpose of the turn-buckle 26 is to take up slack in the truss rods 25 and thus brace the middle portion of the beam 12 so as to enable it to stand a maximum of supporting strain with a minimum of weight.

The sprinkling pipe is shown at 28 and as indicated in Fig. 1, is made up of a number of sections connected together by joints 29 being thus formed into practically a single cylindrical member. The sprinkling pipe is provided with a number of orifices 30 or short nozzles through which water is forced and allowed to make its escape. These orifices or nozzles are distributed throughout the entire length of the pipe. The sprinkling pipe 28 rests directly across a number of the supporting beams 12 as will be understood from Figs. 1 and 2. In order to hold the pipe or rather to prevent it from rolling, I provide guides 31 of the form shown more particularly in Figs. 2 and 4. These guides are mounted upon the beams 12 and are provided with thumb screws 32 for holding them in different positions. This enables them to be shifted along from one position to another relatively to the beams 12 and also to be readily detached and transferred from one of these beams to another as indicated in Fig. 2 by dotted and full lines.

The sprinkling pipe 30 is provided with a hand valve 33 for controlling the flow of the water. The sprinkling pipe 28 is by aid of a swivel joint 34 connected to a hose 35, the latter being also connected to a reservoir 36 or other appropriate source of supplying water.

The reservoir 36 may be located at any desirable point for instance in the middle of a square field. The flexibility of the hose 35 and the ease with which the various movable parts may be shifted in position readily enable the operator to bring the sprinkling pipe 28 over each and every portion of the field providing of course that the hose 35 be of sufficient length for this purpose.

The operation of my system is as follows. The supporting stands 5 are arranged in rows as indicated in Fig. 1, there being preferably at least three of these stands in a row as indicated in Fig. 1. The supporting beams 12 are next placed in position. The hook 18 of a supporting beam is inserted in one of the slots 11 and the supporting beam is extended across to the next supporting stand 5 of the same row, the lug 23 of the supporting beam in question being inserted in the nearest slot 11 of the supporting stand last mentioned. This supporting stand is similarly connected with the third supporting stand of the same row in substantially the same manner just described, that is to say a supporting beam 12 is so arranged that its hook 18 extends into a slot 11 of one supporting stand and its lug 23 extends into a slot of the next supporting stand. The various stands and supporting beams being thus arranged, the sprinkling pipe is laid across a number of the supporting beams 12 as indicated in Fig. 1. The hose 35 is connected with the sprinkling pipe 28 by the swivel joint 34 as above described and water is supplied from the reservoir 36 through the hose 35 to the sprinkling pipe. The operator now turns on the water by aid of the valve 33. The water issues from the various orifices or nozzles 30 and falls upon the ground below and adjacent to the sprinkling pipe. From time to time the sprinkling pipe is moved along the supporting beams 12 upon which it rests. For this purpose the guides 31 are moved along the supporting beams into new positions. The water is cut off for a moment in shifting the sprinkling pipe from one position to another. In order to shift the pipe it is simply rolled along in much the same manner that a log is rolled upon skids, the swivel joint 34 permitting the rotation of the sprinkling pipe without twisting the hose 35. The water is now again turned on with the sprinkling pipe in a new position parallel with its original position. The ground adjacent to the sprinkling pipe having received an adequate supply of water, the process is repeated the pipe being shifted as above described into another position. The travel of the sprinkling pipe relatively to the supporting beams soon frees the particular supporting beams upon which the pipe first rested. These beams being free, they are picked up by hand and carried a little distance in the general direction in which the sprinkling pipe 28 is moved from time to time. The supporting stands thus left free or idle are also moved in the direction indicated and placed in proper position to receive the supporting beams. I have here, therefore, a creeping scaffold for supporting the movable sprinkling pipe; that is a scaffold which is torn down at one of its ends and rebuilt at the opposite end so that the scaffold as a whole virtually creeps along in the direction in which the sprinkling pipe travels.

I do not limit myself to the precise construction shown as variations may be made therein without departing from the spirit of my invention.

Having thus described my invention what I claim as new and desire to secure by Letters Patent is as follows:

1. In a portable irrigation system, the combination of a rigid sprinkling pipe and a supporting scaffold therefor, comprising a plurality of portable stands adapted to be arranged in a plurality of lines, each line including at least three stands, and rigid beams adapted to be detachably connected to successive stands and provided with means for bridging said stands to provide an uninterrupted smooth bearing surface for the pipe, whereby the latter may be rolled upon the line of beams.

2. In a portable irrigation system, the combination of a rigid sprinkling pipe and a supporting scaffold therefor, comprising a plurality of portable stands adapted to be arranged in a plurality of lines, each line including at least three stands, rigid beams adapted to be detachably connected to successive stands and provided with means for bridging said stands to provide an uninterrupted smooth bearing surface for the pipe, whereby the latter may be rolled upon the line of beams, a flexible supply hose, and a swivel joint for connecting the hose and sprinkling pipe.

3. In a portable irrigation system, the combination of a rigid sprinkling pipe and a supporting scaffold therefor, comprising a plurality of portable stands adapted to be arranged in a plurality of lines, each line including at least three stands, rigid beams adapted to be detachably connected to successive stands and provided with means for bridging said stands to provide an uninterrupted smooth bearing surface for the pipe, whereby the latter may be rolled upon the line of beams, and means adapted to be shifted at will along the line of beams and adapted to maintain the sprinkling pipe in predetermined position.

HARRY T. LIBBY.

Witnesses:
WALTON HARRISON,
F. C. BARRY.

Copies of this patent may be obtained for five cents each, by addressing the "Commissioner of Patents, Washington, D. C."